(12) United States Patent
Lekutai et al.

(10) Patent No.: US 12,213,037 B2
(45) Date of Patent: Jan. 28, 2025

(54) NETWORK-ASSISTED BLANKING OF SHARED RESOURCES FOR DIRECT COMMUNICATION LINKS

(71) Applicant: T-Mobile USA, Inc., Bellevue, WA (US)

(72) Inventors: Gaviphat Lekutai, Kirkland, WA (US); Alan Denis MacDonald, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 365 days.

(21) Appl. No.: 17/548,472

(22) Filed: Dec. 10, 2021

(65) Prior Publication Data
US 2023/0188959 A1    Jun. 15, 2023

(51) Int. Cl.
| | |
|---|---|
| *H04W 4/40* | (2018.01) |
| *H04W 16/14* | (2009.01) |
| *H04W 72/04* | (2023.01) |
| *H04W 76/14* | (2018.01) |

(52) U.S. Cl.
CPC ............ *H04W 4/40* (2018.02); *H04W 16/14* (2013.01); *H04W 72/04* (2013.01); *H04W 76/14* (2018.02)

(58) Field of Classification Search
CPC ....... H04W 4/40; H04W 16/14; H04W 72/04; H04W 76/14; H04W 12/08; H04W 92/18; H04W 72/40; H04W 72/0453; H04W 72/51
USPC ....................... 370/329; 455/41.2, 452.1–455
See application file for complete search history.

(56) References Cited

U.S. PATENT DOCUMENTS

| | | |
|---|---|---|
| 6,452,915 B1 | 9/2002 | Jorgensen |
| 6,606,311 B1 | 8/2003 | Wang et al. |
| 6,862,622 B2 | 3/2005 | Jorgensen |
| 7,099,660 B2 | 8/2006 | Boehmke |
| 7,450,948 B2 | 11/2008 | Argyropoulos et al. |
| 7,653,001 B2 | 1/2010 | Agrawal et al. |
| 7,664,025 B2 | 2/2010 | Keskiniva et al. |
| 7,957,356 B2 | 6/2011 | Wang et al. |
| 8,055,290 B1 | 11/2011 | Cai et al. |

(Continued)

FOREIGN PATENT DOCUMENTS

| | | |
|---|---|---|
| DE | 102020201827 A1 | 8/2020 |
| EP | 0811298 A1 | 12/1997 |

(Continued)

*Primary Examiner* — Michael Y Mapa
(74) *Attorney, Agent, or Firm* — Perkins Coie LLP

(57) ABSTRACT

A method is performed by a wireless mobile network to mitigate interference between communication links. A request is received for resources needed to support an application by a vehicle relative to another vehicle. The resources are configured based on the application and are used to establish a direct communication link between the vehicles. The resources are to be shared between the direct communication link and another communication link. The mobile network defines certain blanked resources that are disallowed for use to perform the application. Any remaining resources (or non-blanked resources) are allowed for use to perform the application. The blanked resources can be used by the other communication link to avoid interference with the direct communication link. The allocation of resources is communicated to the vehicle to establish the direct communication link with the other vehicle.

19 Claims, 4 Drawing Sheets

(56) References Cited

U.S. PATENT DOCUMENTS

| | | |
|---|---|---|
| 8,345,585 B2 | 1/2013 | De Jaeger et al. |
| 8,634,842 B2 | 1/2014 | Zhang et al. |
| 8,649,794 B2 | 2/2014 | Gustavsson et al. |
| 8,717,929 B2 | 5/2014 | Smith et al. |
| 8,804,625 B2 | 8/2014 | Akhtar |
| 8,825,070 B2 | 9/2014 | Akhtar et al. |
| 8,837,386 B2 | 9/2014 | Ekici et al. |
| 8,837,418 B2 | 9/2014 | Smith et al. |
| 8,849,331 B2 | 9/2014 | Liu et al. |
| 8,862,144 B2 | 10/2014 | Sayadi et al. |
| 8,934,439 B2 | 1/2015 | Smith et al. |
| 8,954,032 B1 | 2/2015 | Stoler |
| 8,976,677 B2 | 3/2015 | Novak et al. |
| 8,989,105 B2 | 3/2015 | Wu |
| 9,008,018 B2 | 4/2015 | Sirotkin et al. |
| 9,008,651 B2 | 4/2015 | Kun-szabo et al. |
| 9,030,972 B2 | 5/2015 | Horneman et al. |
| 9,055,507 B2 | 6/2015 | Chami et al. |
| 9,094,899 B2 | 7/2015 | Smith et al. |
| 9,203,714 B2 | 12/2015 | Smith et al. |
| 9,224,169 B2 | 12/2015 | Smith et al. |
| 9,226,193 B2 | 12/2015 | Smith et al. |
| 9,301,155 B2 | 3/2016 | Caldwell et al. |
| 9,338,704 B2 | 5/2016 | Smith et al. |
| 9,560,661 B2 | 1/2017 | Elhaddad et al. |
| 9,699,692 B2 | 7/2017 | Brahmi et al. |
| 9,706,558 B2 | 7/2017 | Lioulis et al. |
| 9,736,018 B2 | 8/2017 | Smith |
| 9,877,139 B2 | 1/2018 | Venkatachalam et al. |
| 9,894,661 B2 | 2/2018 | Worrall et al. |
| 9,923,657 B2 | 3/2018 | Forenza et al. |
| 9,924,515 B2 | 3/2018 | Zhang et al. |
| 10,039,107 B2 | 7/2018 | Faerber et al. |
| 10,080,171 B2 | 9/2018 | Murphy |
| 10,104,704 B2 | 10/2018 | Sharma et al. |
| 10,390,231 B2 | 8/2019 | Smith et al. |
| 10,433,319 B2 | 10/2019 | Kahtava et al. |
| 10,531,441 B2 | 1/2020 | Wong |
| 10,694,559 B2 | 6/2020 | Stauffer et al. |
| 10,779,189 B2 | 9/2020 | Khoryaev et al. |
| 10,834,771 B2 | 11/2020 | Sharma et al. |
| 11,057,907 B2 | 7/2021 | Jones |
| 11,068,906 B2 | 7/2021 | Smith et al. |
| 11,089,515 B2 | 8/2021 | Bogineni et al. |
| 2005/0250468 A1 | 11/2005 | Lu et al. |
| 2006/0088003 A1 | 4/2006 | Harris |
| 2006/0142032 A1 | 6/2006 | Derakhshan et al. |
| 2006/0221933 A1 | 10/2006 | Bauer et al. |
| 2007/0271234 A1 | 11/2007 | Ravikiran |
| 2008/0151806 A1 | 6/2008 | Bereski et al. |
| 2008/0151845 A1 | 6/2008 | Jaakkola et al. |
| 2009/0016300 A1 | 1/2009 | Ahmavaara et al. |
| 2009/0180430 A1 | 7/2009 | Fadell |
| 2010/0041403 A1 | 2/2010 | Khetawat et al. |
| 2010/0254334 A1 | 10/2010 | Song et al. |
| 2011/0019715 A1 | 1/2011 | Brisebois |
| 2012/0020393 A1 | 1/2012 | Patil et al. |
| 2014/0092828 A1 | 4/2014 | Sirotkin |
| 2015/0111590 A1 | 4/2015 | Gruet et al. |
| 2015/0208401 A1* | 7/2015 | Lu ................. H04W 76/11 |
| | | 455/452.1 |
| 2016/0198360 A1 | 7/2016 | Smith |
| 2016/0295564 A1 | 10/2016 | Landry et al. |
| 2016/0328120 A1 | 11/2016 | Smith |
| 2016/0373935 A1 | 12/2016 | Smith et al. |
| 2017/0019887 A1* | 1/2017 | Jiang ................. H04W 72/23 |
| 2017/0099658 A1 | 4/2017 | Shattil |
| 2018/0234898 A1* | 8/2018 | Kahtava .............. H04W 72/23 |
| 2019/0327679 A1 | 10/2019 | Gupta et al. |
| 2020/0113015 A1 | 4/2020 | Basu Mallick et al. |
| 2020/0119459 A1 | 4/2020 | Fried et al. |
| 2020/0196353 A1 | 6/2020 | Zhang et al. |
| 2020/0260353 A1 | 8/2020 | Xu et al. |
| 2020/0343969 A1 | 10/2020 | Cui et al. |
| 2021/0160890 A1 | 5/2021 | Selvanesan et al. |
| 2021/0235277 A1 | 7/2021 | Parekh et al. |
| 2021/0235323 A1 | 7/2021 | Parekh et al. |
| 2022/0116814 A1* | 4/2022 | Di Girolamo ....... H04W 4/027 |
| 2022/0322295 A1* | 10/2022 | Nguyen ............... H04W 72/02 |

FOREIGN PATENT DOCUMENTS

| | | |
|---|---|---|
| EP | 2403292 B1 | 1/2013 |
| EP | 2962486 A1 | 1/2016 |
| EP | 2974429 B1 | 11/2018 |
| EP | 3235316 B1 | 4/2019 |
| EP | 3278592 B1 | 10/2019 |
| EP | 3732932 A1 | 11/2020 |
| EP | 3840459 A1 | 6/2021 |
| EP | 3845016 A1 | 7/2021 |
| EP | 3857971 A1 | 8/2021 |
| EP | 3858011 A1 | 8/2021 |
| WO | 2016149372 A1 | 9/2016 |
| WO | 2017165493 A1 | 9/2017 |
| WO | 2018022629 A1 | 2/2018 |
| WO | 2018125686 A2 | 7/2018 |
| WO | 2020061314 A1 | 3/2020 |
| WO | 2020082336 A1 | 4/2020 |
| WO | 2020144203 A2 | 7/2020 |
| WO | 2020222203 A1 | 11/2020 |
| WO | 2020226979 A2 | 11/2020 |

* cited by examiner

NETWORK-ASSISTED BLANKING OF SHARED RESOURCES FOR DIRECT COMMUNICATION LINKS

BACKGROUND

Vehicle-to-everything (V2X) relates to technology that enables communications between a vehicle and an entity that may affect or be affected by the vehicle. V2X can use communication technologies including wireless local-area network (WLAN) and cellular. V2X can include a vehicular communication system that incorporates specific types of communication such as V2I (vehicle-to-infrastructure), V2N (vehicle-to-network), V2V (vehicle-to-vehicle), V2P (vehicle-to-pedestrian), V2D (vehicle-to-device), and V2G (vehicle-to-grid). Some motivations for V2X include road safety, traffic efficiency, and energy savings. For example, studies have shown that the incidence rate of traffic accidents would decrease significantly if a ubiquitous V2V system were implemented.

A direct communication between a vehicle and another device (e.g., V2V, V2I) uses a so-called PC5 interface, where a base station is not required for the communication. PC5 refers to a reference point where a wireless device, such as a mobile handset, directly communicates with another wireless device over a direct channel. In 3rd Generation Partnership Project (3GPP), the term "sidelink" is used to refer to the direct communications. In cellular V2X (C-V2X), direct communication is assisted by the wireless mobile network. At the system-architectural level, proximity service (ProSe) is the feature that specifies the architecture of the direct communication between wireless devices.

In one example, PC5 interfaces address the needs of mission-critical communication for public-safety purposes (e.g., Public Safety-LTE); this was enabled by the functionality in 3GPP release 13. The motivation of the mission-critical communication was to allow law-enforcement agencies or emergency rescue to use LTE communication even when a network infrastructure is not available, such as scenarios involving natural disasters. In 3GPP release 14 onwards, the use of the PC5 interface is expanded to meet various market needs, such as communications involving wearable devices such as smartwatches.

BRIEF DESCRIPTION OF THE DRAWINGS

Detailed descriptions of implementations of the present invention will be described and explained through the use of the accompanying drawings.

Figure 1:
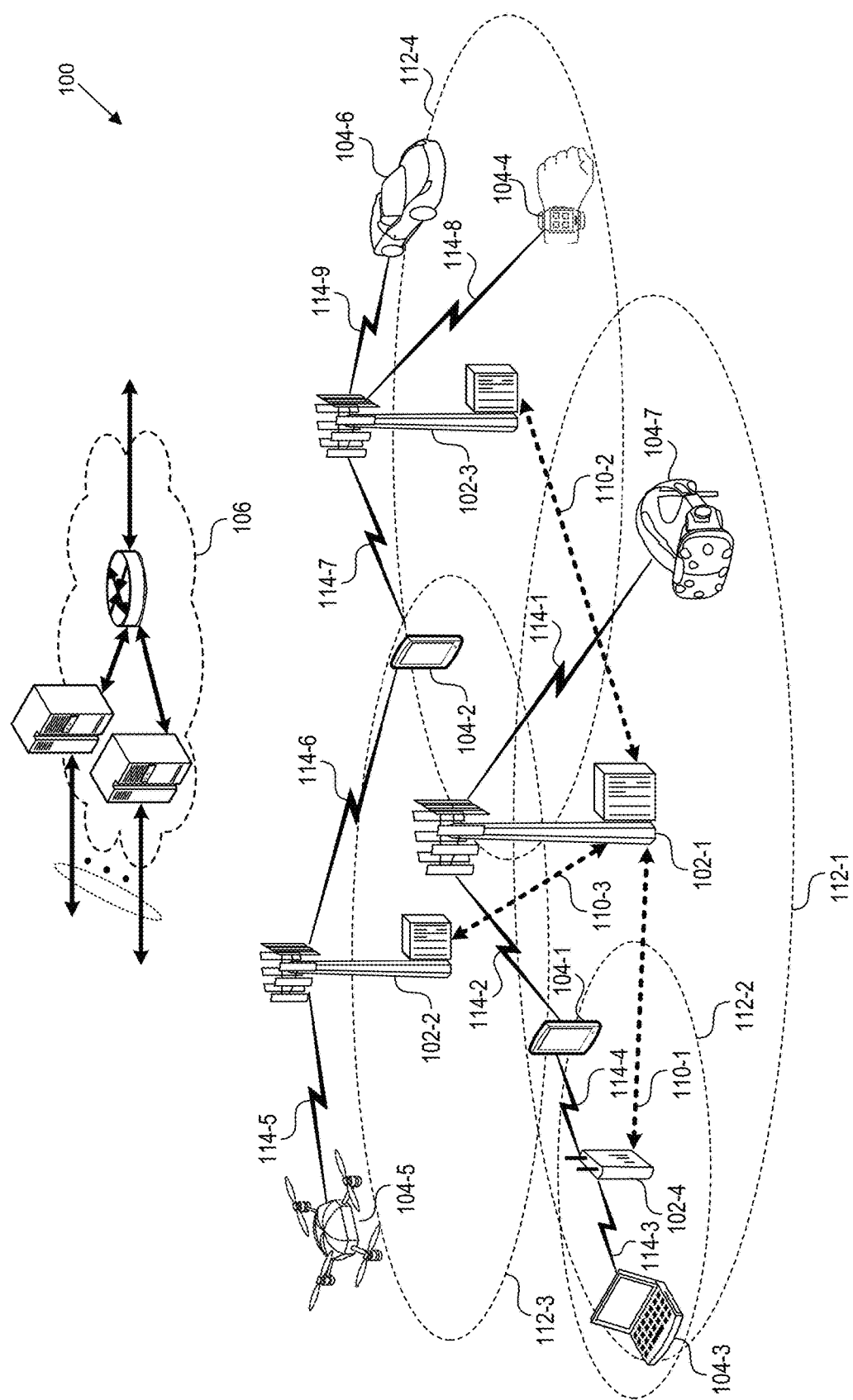
FIG. 1 is a block diagram that illustrates a wireless communications system.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

Autonomous driving, driver assistance, cooperative operations, remote driving, traffic management, and other applications of vehicle-to-everything (V2X) communications require or can benefit from widespread vehicle-to-vehicle (V2V) direct communications. V2V communications often utilize radio spectrum resources that are provided and managed by nearby base stations of a wireless mobile communication network ("mobile network") such as a telecommunications network. Of particular concern when allocating resources in such scenarios is interference between different types of communication links. In principle, mobile network communication links (also referred to herein as "mobile communication links" or "Uu links") can interfere with each other; however, base stations implement a variety of techniques to mitigate such interference between the same type of communication links. However, interference can occur between the long-range links that are managed by the mobile network and short-range links (also referred to herein as "direct communication links," "PC5 links" or "sidelinks") that directly connect vehicles. In some cases, a mobile network can assist to manage the direct communications, particularly when there are several wireless devices and/or other devices engaged in a region.

To avoid interference among direct communication links and mobile communication links, a blanking solution is proposed, whereby the mobile network reserves a portion of its radio resources for certain Uu and/or PC5 links-essentially blanking-out or muting that portion from a particular direct communication link. In one case, the mobile network can choose which Resource Blocks (RBs) to blank. For example, the mobile network can flexibly select a blanking pattern (e.g., spectrum's edges, middle, left/right halves). This flexibility enables extending blanking to other applications involving, for example, drones, Internet-of-Things (IoT) devices, and other applications where interference is caused due to multiple devices sharing resources or multiple operators.

In one example, a communication device of a vehicle requests from the mobile network a number of RBs that satisfy a latency, bit rate, communication range, reliability and/or other requirement based on a specific application (e.g., platooning, left-turn assist, intersection-movement assist, cooperative lane merging). The mobile network allocates the requested RBs-blanking the rest in that spectrum-thereby more efficiently allocating spectrum resources by ensuring that only certain resources that an application requires are allocated to the associated vehicle. In another example, the vehicle communicates the application to the mobile network, which determines the appropriate RBs (e.g., using a lookup table) and allocates blanked and non-blanked resources to the vehicle accordingly.

The blanking technique can also work where vehicles autonomously establish direct communication links without assistance from a mobile network (e.g., where base stations do not broker spectrum resources). Instead, resource allocation is based on a resource table or map that is stored at the vehicle, which can access a pool of resources. As such, the resource map is used to select blanked resources. The locations of the blanked resources can be communicated to other vehicles, which share the same spectrum but can use the blanked resources for communicating and thereby mitigate interference. In yet another example, blanking is implemented at the vehicles themselves based on local resource maps. In addition, different spectrums can implement different blanking techniques.

The blanking technique can also be used when multiple carrier frequencies are available (e.g., 600 MHz, 2.5 GHz, 28 GHz). In one example, blanking can be implemented at the application layer on a per-packet basis (e.g., where the vehicle requests RBs that meet certain specifications). In another example, blanking is implemented at the core network based on quality-of-service (QoS) profiles, possibly through network slicing (e.g., where the network determines which RBs to allocate based on the application).

In yet another example, blanking can be implemented at a Radio Access Network (RAN) in the event of overcrowding and resource scarcity. Here, blanking could be based on mapping of Radio Bearers, possibly in accordance with a policy formulated by a RAN intelligent controller (RIC). For example, a near real-time RIC in the baseband (per Open RAN Alliance framework) could be a mechanism to trigger blanking. For example, a software module called xApp could perform specific tasks such as traffic steering, load balancing, beamforming, etc. This is done by gathering network node information from the OSS, network element manager, FCAPS (fault, configuration, accounting, performance and security), and the like. The xApp will post process and provide the policy back to the network. In an implementation, the xApp of the near real-time RIC can provide an overlay of V2X application weights such that particular frequencies can be applied to a user based on the V2X application. For example, for platooning traffic, the RIC can modify weights based on the application, dynamic load, and conditions. The available frequencies can be mapped to a V2X application weight (e.g., 2.5 GHz→0; 600 MHz→0; 600 MHz (50% blanking)→0; 600 MHz (10:80 i.e., middle 80% blanking)→100). As such, available frequencies can override a policy with a weight that steers the particular platooning user traffic to, for example, 10:80:10 (i.e., 80% blanking in middle spectrum and 10% non-blanking in lower and upper spectrums or vice-versa).

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Wireless Communications System

FIG. 1 is a block diagram that illustrates a wireless telecommunication network 100 ("network 100") in which aspects of the disclosed technology are incorporated. The network 100 includes base stations 102-1 through 102-4 (also referred to individually as "base station 102" or collectively as "base stations 102"). A base station is a type of network access node (NAN) that can also be referred to as a cell site, a base transceiver station, or a radio base station. The network 100 can include any combination of NANs including an access point, radio transceiver, gNodeB (gNB), NodeB, eNodeB (eNB), Home NodeB or Home eNodeB, or the like. In addition to being a wireless WAN (WVAN) base station, a NAN can be a wireless local area network (WLAN) access point, such as an Institute of Electrical and Electronics Engineers (IEEE) 802.11 access point.

The NANs of a network 100 formed by the network 100 also include wireless devices 104-1 through 104-7 (referred to individually as "wireless device 104" or collectively as "wireless devices 104") and a core network 106. The wireless devices 104-1 through 104-7 can correspond to or include network 100 entities capable of communication using various connectivity standards. For example, a 5G communication channel can use millimeter wave (mmW) access frequencies of 28 GHz or more. In some implementations, the wireless device 104 can operatively couple to a base station 102 over a long-term evolution/long-term evolution-advanced (LTE/LTE-A) communication channel, which is referred to as a 4G communication channel.

The core network 106 provides, manages, and controls security services, user authentication, access authorization, tracking, Internet Protocol (IP) connectivity, and other access, routing, or mobility functions. The base stations 102 interface with the core network 106 through a first set of backhaul links (e.g., S1 interfaces) and can perform radio configuration and scheduling for communication with the wireless devices 104 or can operate under the control of a base station controller (not shown). In some examples, the base stations 102 can communicate with each other, either directly or indirectly (e.g., through the core network 106), over a second set of backhaul links 110-1 through 110-3 (e.g., X1 interfaces), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The network 100 can include base stations of different types (e.g., macro and/or small cell base stations). In some implementations, there can be overlapping geographic coverage areas 112 for different service environments (e.g., Internet-of-Things (IoT), mobile broadband (MBB), vehicle-to-everything (V2X), machine-to-machine (M2M), machine-to-everything (M2X), ultra-reliable low-latency communication (URLLC), machine-type communication (MTC), etc.).

The network 100 can include a 5G network 100 and/or an LTE/LTE-A or other network. In an LTE/LTE-A network, the term eNB is used to describe the base stations 102, and in 5G new radio (NR) networks, the term gNBs is used to describe the base stations 102 that can include mmW communications. The network 100 can thus form a heterogeneous network 100 in which different types of base stations provide coverage for various geographic regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow access by wireless devices that have service subscriptions with a wireless network 100 service provider. As indicated earlier, a small cell is a lower-powered base station, as compared to a macro cell, and can operate in the same or different (e.g., licensed, unlicensed) frequency bands as macro cells. Examples of small cells include pico cells, femto cells, and micro cells. In general, a pico cell can cover a relatively smaller geographic area and can allow unrestricted access by wireless devices that have service subscriptions with the network 100 provider. A femto cell covers a relatively smaller geographic area (e.g., a home) and can provide restricted access by wireless devices having an association with the femto unit (e.g., wireless devices in a closed subscriber group (CSG), wireless devices for users in the home). A base station can support one or multiple (e.g., two, three, four, and the like) cells (e.g., component carriers). All fixed transceivers noted herein that can provide access to the network 100 are NANs, including small cells.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the network 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), or a wearable (e.g., wireless device 104-4). A wireless device can be included in another device such as, for example, a drone (e.g., wireless device 104-5), a vehicle (e.g., wireless device 104-6), an augmented reality/virtual reality (ARNR) device such as a head-mounted display device (e.g., wireless device 104-7), an IoT device such as an appliance in a home, a portable gaming console, or a wirelessly connected sensor that provides data to a remote server over a network.

A wireless device can communicate with various types of base stations and network 100 equipment at the edge of a network 100 including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-9 (also referred to individually as "communication link 114" or collectively as "communication links 114") shown in network 100 include uplink (UL) transmissions from a wireless device 104 to a base station 102, and/or downlink (DL) transmissions from a base station 102 to a wireless device 104. The downlink transmissions can also be called forward link transmissions while the uplink transmissions can also be called reverse link transmissions. Each communication link 114 includes one or more carriers, where each carrier can be a signal composed of multiple sub-carriers (e.g., waveform signals of different frequencies) modulated according to the various radio technologies. Each modulated signal can be sent on a different sub-carrier and carry control information (e.g., reference signals, control channels), overhead information, user data, etc. The communication links 114 can transmit bidirectional communications using frequency division duplex (FDD) (e.g., using paired spectrum resources) or Time division duplex (TDD) operation (e.g., using unpaired spectrum resources). In some implementations, the communication links 114 include LTE and/or mmW communication links.

In some implementations of the network 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that can take advantage of multi-path environments to transmit multiple spatial layers carrying the same or different coded data.

Cellular Vehicle-to-Everything (V2X)

Cellular V2X (C-V2X) supports both direct communications between vehicles and mobile communications between vehicles and mobile networks. Examples of direct communications (e.g., PC5, sidelink) include V2V, vehicle-to-road and infrastructure (V2I), and vehicle-to-pedestrian (V2P). Examples of mobile communications (e.g., Uu) include vehicle-to-network (V2N). These types of communications are referred to in terms of different modes in LTE-V2X or New Radio (NR)-V2X. In NR-V2X, mode 1 refers to NR mobile network communications and mode 2 refers to NR direct communications between vehicles. In LTE-V2X, mode 3 refers to LTE mobile network communications and mode 4 refers to LTE direct communications. 5G-V2X includes modes 1 through 4.

As used herein, "mode 1" relates to mobile network assisted scheduling of direct communications links. In contrast, "mode 2" relates to autonomous resource allocation, where wireless devices autonomously select their resources from a resource pool. The disclosed technology is primarily directed to mode 1 communications and, as such, the disclosure largely focuses on mode 1 and a detailed description of mode 2 is omitted for the sake of brevity. In general, however, many of the disclosed techniques can be applied in the context of mode 2 to mitigate interference between a direct communication link and other communications links.

In mode 1, a base station (e.g., gNB) of a mobile network schedules sidelink (SL) resources for a PC5 link. The Uu can assign SL resources for cases of a licensed carrier shared between Uu and SL and a carrier dedicated to SL. The SL radio resources can be configured so that mode 1 and mode 2 use separate resource pools. The alternative is that mode 1 and mode 2 share a resource pool. In using Dynamic Grant (DG) scheduling, wireless devices request resources to the base station for the transmission of data (e.g., SL data called Transport Blocks (TB)). The wireless device sends a Scheduling Request (SR) to the base station, which responds with an indication of SL resources such as slots, subchannels, etc.

Nearby wireless devices operating under mode 2 can then learn which resources are used by wireless devices in mode 1. For DG, the UE sends an SR at time t1 to request resources for transmitting TB1. The base station responds with a DCI at t2 that indicates the resources for use at t3. The same process takes place starting at t4 when TB2 is generated. TB2 can be transmitted using the next set of resources allocated later.

In Configured Grant (CG) scheduling, a DG delay is reduced by pre-allocating SL radio resources, where the base station assigns a set of SL resources to a wireless device for transmitting data. The wireless device does not request resources but waits until the base station grants the resources. A wireless device first sends a message with wireless device assistance information to the base station indicating expected SL traffic such as periodicity of TBs, TB maximum size, and QoS information (e.g., latency, reliability). The base station can create, configure, and allocate a CG to the wireless device that satisfies the requirements of SL traffic such as CG index, the time-frequency allocation, the periodicity of allocated SL resources, etc.

In the United States, the FCC manages commercial use of the radio frequency spectrum and allocates spectrum for specific uses. For example, the 5.9 GHz band was previously allocated for intelligent transportation systems (ITS); specifically, for Dedicated Short Range Communications (DSRC) vehicle safety technologies. On Nov. 18, 2020, the FCC split the 5.9 GHz band to reallocate the lower 45 MHz of the band to unlicensed uses (e.g., Wi-Fi) and the upper 30 MHz of the band for C-V2X. Like DSRC, C-V2X can operate independently from the cellular network for V2V and V21 communications but can also connect to 4G and 5G networks. 5G networks, once fully deployed, offer high-speed, low-latency (i.e., reduced lag time) services, critical for safety applications and autonomous vehicle operation. The adoption of C-V2X will accelerate the deployment of compatible 5G systems, including traffic lights, traffic control systems, and personal devices.

Figure 2:
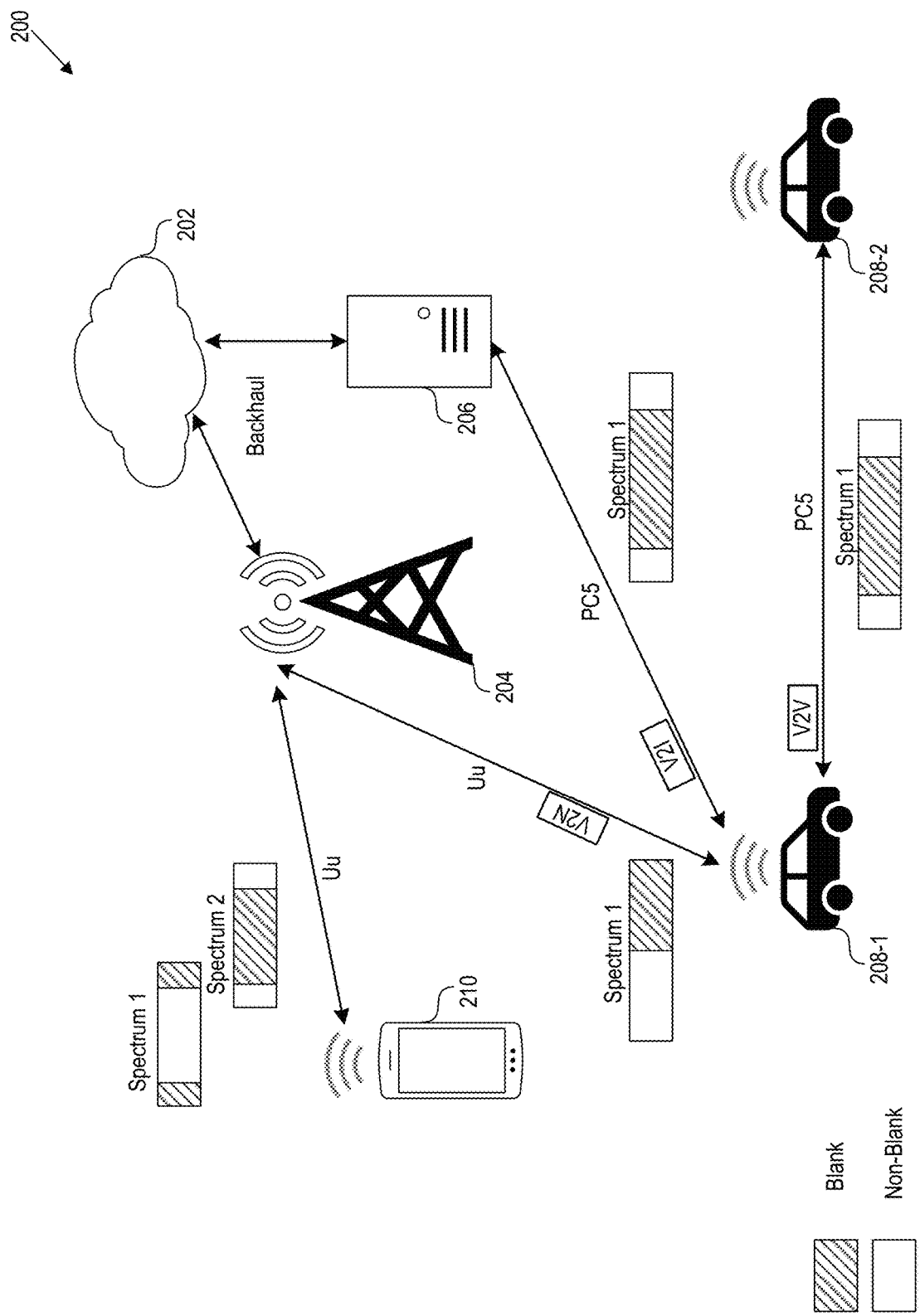
FIG. 2 is a diagram that illustrates a system for network-assisted blanking of a shared resource to mitigate interference between communication links.

FIG. 2 is a diagram that illustrates a system for network-assisted blanking of a shared resource to mitigate interference between communication links. The system 200 optionally includes a cloud and ITS services 202 that provide information technology (IT) as a service over the Internet or telecommunications network, with delivery on demand, and/or payment based on usage. Cloud based services range from full applications and development platforms, to servers, storage, and virtual desktops. As such, a base station 204 can communicatively couple to the cloud and ITS services 202 over a backhaul network.

A stationary device 206 (e.g., roadside unit (RSU)) includes a transceiver and can be mounted along a road or pedestrian passageway. In the illustrated example, the stationary device 206 is communicatively coupled to the cloud and ITS services 202 over the backhaul network. The stationary device 206 may also be mounted on a vehicle or is hand-carried, but it may only operate when the vehicle or hand-carried unit is stationary. The V2N link between the base station 204 and a vehicle 208-1 is a mobile network communication link (e.g., Uu link). The V21 link between the stationary device 206 and the vehicle 208-1 is a direct communication link (e.g., PC5 link). The V2V link between the vehicle 208-1 and vehicle 208-2 is another direct communication link. In addition, a mobile device 210 is near or inside the vehicle 208-1 and has a Uu link to the base station 204.

In mode 1, the base station 204 assists in establishing a direct communication link between the vehicle 208-1 and the vehicle 208-2. For example, the computing device of each vehicle can have a SL interface configured to establish a PC5 link. A Uu interface of the base station 204 can be used to allocate radio resources for the direct communication link. A problem with this form of resource allocation includes the potential for interference between the interfaces for the Uu link and the PC5 link because they can share the same radio spectrum band. In addition, the stationary device 206 and/or mobile device 210 can create or experience interference due to the PC5 link between the vehicles 208-1 and 208-2. This is particularly problematic because a PC5 link can be critical in vehicle applications such as platooning, left turn assist, intersection movement assist, and other communications where, if they fail, can result in injury or death. As such, the PC5 link can share resources with another direct communication link or Uu link while mitigating the risk of interference.

The disclosed technique blanks or mutes certain portions of resources to mitigate interference experienced or created by a direct communication link. Two vehicles that are connected by a direct communication link are disallowed to use the blanked resources for certain communications whereas the non-blanked resources can be used for those communications. The blanked resources are instead reserved for other communications such as for a Uu link. As such, the two communications links can share a common resource without interfering with each other.

The blanked resources (or a blanked portion of a resource) can depend on a type of application that a vehicle seeks to perform. Examples include platooning of multiple vehicles, cooperative operation including sensor sharing among multiple vehicles, remote driving, autonomous driving, driver assistance, traffic management, safety management, or navigation. In one example, blanking of a radio spectrum band is scheduled on a network basis. For example, the blanking can be fixed so that only one pattern is used by an entire network. In another example, the system uses flexible blanking where a blanking pattern depends on users or types of wireless devices used for communications. As such, blanking can be implemented across additional applications (e.g., IoT or drone devices) and any other deployment scenario where interference can occur (e.g., due to multiple network operators being in the same region).

In order to blank resources of single or multiple carrier bands (e.g., 600 MHz, 2.5 GHz, 28 GHz), different blanking techniques can be implemented. Examples include blanking at an application layer on a per packet basis, upstream at a core network based on QoS profiles (including network slicing), at the RAN based on radio bearer mapping of a RIC policy, or based on a vehicle's resource blanking map, etc. For example, QoS Class Identifier (QCI) is used in LTE to ensure that carrier traffic is allocated an appropriate QoS. Different carrier traffic requires different QoS and therefore different QCI values. A core network can define a QCI profile with 9 levels: conversational voice (QCI 1), conversational video (QCI 2), real-time gaming (QCI 3), non-conversational video (QCI 4), IMS signaling (QCI 5), video buffered streaming such as email, chat, and www (QCI 6), mobile virtual network operator (MVNO) (QCI 7), tethering (QCI 8), and deprioritized users (QCI 9). In this implementation, V2X applications can be mapped to QCI levels. For example, a platooning application could be mapped to QCI 3 and a remote driving application could be mapped to QCI 2. In NR, 5G1 is used instead of QCI and includes additional fields such as 5Q1 21-23 for guaranteed bit rate (GBR) applications, 5Q1 55-59 for non-GBR applications, 5Q1 90-91 delayed critical GBR. The disclosed technology could use a network slicing framework to adapt to, for example, QCI 21 for GBR with blanking pattern 1 (e.g., 50:50), QCI 22 for GBR with blanking pattern 2 (e.g., 10:80:10 where the lower edge 10% non-blank, middle 80% spectrum blanking and upper edge 10% non-blank), etc. Thus, based on the V2X application, such as platooning PC5 communication, the core network can assign QCI 22 to this application while for remote driving Uu communication, the core network can assign QCI 21 to that application.

In another example, different techniques can be applied to different spectrum bands as well. For example, FIG. 2 illustrates different blanking patterns of radio spectrum bands used in V2N, V21, V2V, and for other communications links. In mode 2, a direct communication link is autonomously established between the vehicle 208-1 and the vehicle 208-2. That is, unlike mode 1, the direct communication link in mode 2 is established and resources are allocated without assistance from a mobile network. In on example, RB allocation is pre-configured at a vehicle based on a pool of RBs. A vehicle can switch between modes 1 and 2 seamlessly without interference. A vehicle in mode 2 can benefit from the disclosed technique by obtaining the schedule of blanked resources of another vehicle. For example, a vehicle in mode 1 can broadcast its schedule of blanked resources to other nearby vehicles in mode 2, which can then use the blanked resources for communications that thereby avoid interference.

Figure 3:
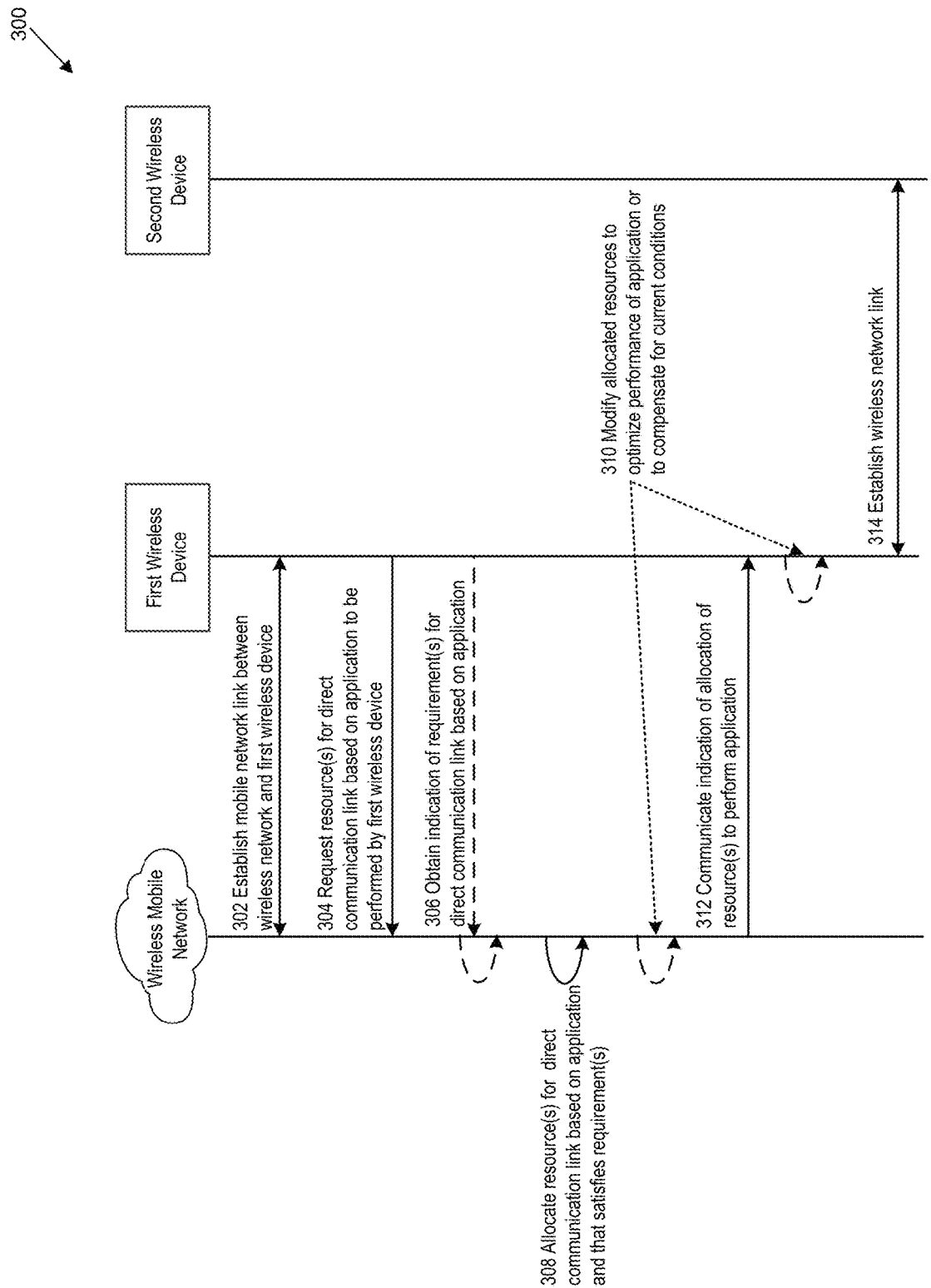
FIG. 3 is a flow diagram that illustrates a process for blanking portions of a shared resource for use to support an application using a direct communication link.

FIG. 3 is a flow diagram that illustrates a process 300 for blanking portions of a shared resource (or blanking certain resources) to support an application using a direct communication link. The process 300 can be performed by a mobile network such as a telecommunications or cellular network. In one example, components of the mobile network, including base stations and/or the core network, perform the process 300 in cooperation with wireless devices seeking to establish network-assisted direct communication links.

At 302, the mobile network establishes a mobile communication link (a first mobile communication link) between a network access node (e.g., base station) and a wireless device (e.g., a first wireless device). Examples of the wireless device include a vehicle device (e.g., navigation device, autonomous or semi-autonomous driving system), an IoT device, a drone device, a mobile terminal (e.g., mobile phone), a smart device (e.g., smart watch, wearable device), or any other electronic device that is capable of connecting with the mobile network.

At 304, the mobile network receives a request to allocate resources for the first wireless device to support an application (e.g., a C-V2X application). An example of a resource includes a radio spectrum band, Resource Blocks (RBs), subchannels, and the like. The request is sent from the first wireless device over the first mobile communication link to the mobile network. The request may explicitly indicate one or more resources or indicate an operation of the application or a type of application, based on which the mobile network can determine suitable resources for performing the application. The application is to be performed by the first wireless device relative to another wireless device (e.g., a second wireless device). The application requires establishing a direct communication link between the first and second wireless devices.

Examples of types of applications, in the context of C-V2X communications, include platooning of multiple vehicles, cooperative operation including sensor sharing among multiple vehicles, remote driving of a vehicle, autonomous driving of a vehicle, driver assistance, traffic management of multiple vehicles, safety management for a vehicle, or vehicle navigation. For example, a vehicle can communicate a request to the mobile network to assist with performing a left-turn autonomously or semi-autonomously.

At 306, the mobile network optionally obtains an indication of one or more requirements for the direct communication link. Examples include a minimum communication speed, a minimum communication range, a power level for communications, or any other communications parameter. The requirements can be indicated explicitly, or a type of application can be associated with one or more requirements. For example, a base station can receive an indication of a type of application over the first mobile communications link and, based on that application, look-up requirements for the direct communication link to perform the application. In another example, requirements are selected at the first wireless device based on data stored thereat and communicated to the mobile network over the first mobile communication link. In another example, requirements are selected at the mobile network (e.g., upstream at the core network) based on data stored thereat. As such, allocated resources are configured to satisfy specified requirements.

At 308, the mobile network responds to the request by allocating resource(s) for use to establish the direct communication link. In one example, resource(s) are allocated based on the application or a type of application and configured accordingly. For example, the mobile network can process an indication of a type of application from among multiple types of application that can be performed by the first wireless device. The mobile network can select requirement(s) for the direct communication link based on a type of the application and configure the resource(s) in accordance with the selected requirement(s). As such, allocation of resource(s) can depend on a type of application and associated requirement(s).

In one example, the mobile network provisions a radio spectrum band (e.g., 600 MHz, 700 MHz, 1.7/2.1 GHz, 1.9 GHz, 2.5 GHz) that is configured to share with a second mobile network link. In one example, the second mobile communication network link is the same as the first mobile communication network link used by the wireless device to communicate the request and/or requirement(s). In another example, a different mobile communication network link that connects to a third wireless device shares the radio spectrum band with the direct communication link. As such, the second mobile communication network link or the direct communication link can create or experience interference relative to each other.

The radio spectrum band can be configured to include a blanked portion that is disallowed for use to perform the application, where the remaining portion is allowed for use to perform the application. For example, a set of RBs can be allocated to the first wireless device for use to communicate with the second wireless device over the direct communication link. The mobile network can select a first subset of the RBs as blanked resources and select a second subset of RBs as non-blanked resources. The blanked portion of the radio spectrum band can have a pattern including multiple windows that are disallowed from carrying data associated with performing the application.

In the example involving the third wireless device, blanked resources of the radio spectrum band can be used by the third wireless device to mitigate interference with the non-blanked resources used by the first and second wireless devices. For example, the mobile network can establish the second network communications link between the mobile network and the third wireless device, where the blanked resources of the radio spectrum band are allowed for use to communicate with the third wireless device.

At 310, optionally, the allocation of resources for the direct communication link updates, changes, or adapts to optimize performance of the application or to compensate or compliment current network or communications conditions. For example, a configuration of the radio spectrum band for the direct communication link can adapt to current conditions of the mobile network or wireless devices connected to the network. In one example, resources that have been allocated by the mobile network are adapted at the first wireless device based on a local resource map. An example of the resource map is a preconfigured map that defines patterns for blanked portions of resources for different types of applications. That is, the resource map can define a pattern of blanked RBs, which are disallowed for use to perform a particular application. In one example, resources are adapted based on data at the core network. An example includes a QoS profile of the direct communication link, security threats data, or current network loads.

In another example, resources are adapted based on data at the edge of the network such as the RAN. In one example, the data can include a radio bearer mapping of a RIC policy. In another example, the core network selects a pattern of blanked RBs and the RAN can change that pattern to adapt to a current traffic load, a policy, or other factors that are not readily known or detected by upstream network components. For example, a base station can increase a frequency of blanked RBs when multiple wireless devices are detected nearby. As such, a pattern of blanked resources can be dynamically adapted to mitigate potential or actual interference between changing or new communication links.

At 312, the mobile network communicates, to the first wireless device, the allocated resources or an indication thereof to perform the application in accordance with requirement(s) and based on current conditions of the network or nearby devices. For example, the mobile network can communicate an indication of the provisioned radio spectrum band configured to include non-blanked resources for use by a vehicle to perform the application while mitigating potential interference with other communication links that can use the blanked resources. The communication can include a communication of the blanked or non-blanked resources, or both. For example, if only an indication of the blanked resources is communicated, then the first wireless device can determine that the remaining resources are non-blanked. The vehicle can also use the blanked resources to communicate with mobile network over a mobile communications network link. The allocation of the configured resources causes the first wireless device to establish the direct communication link with the second wireless device at 314.

Computer System

Figure 4:
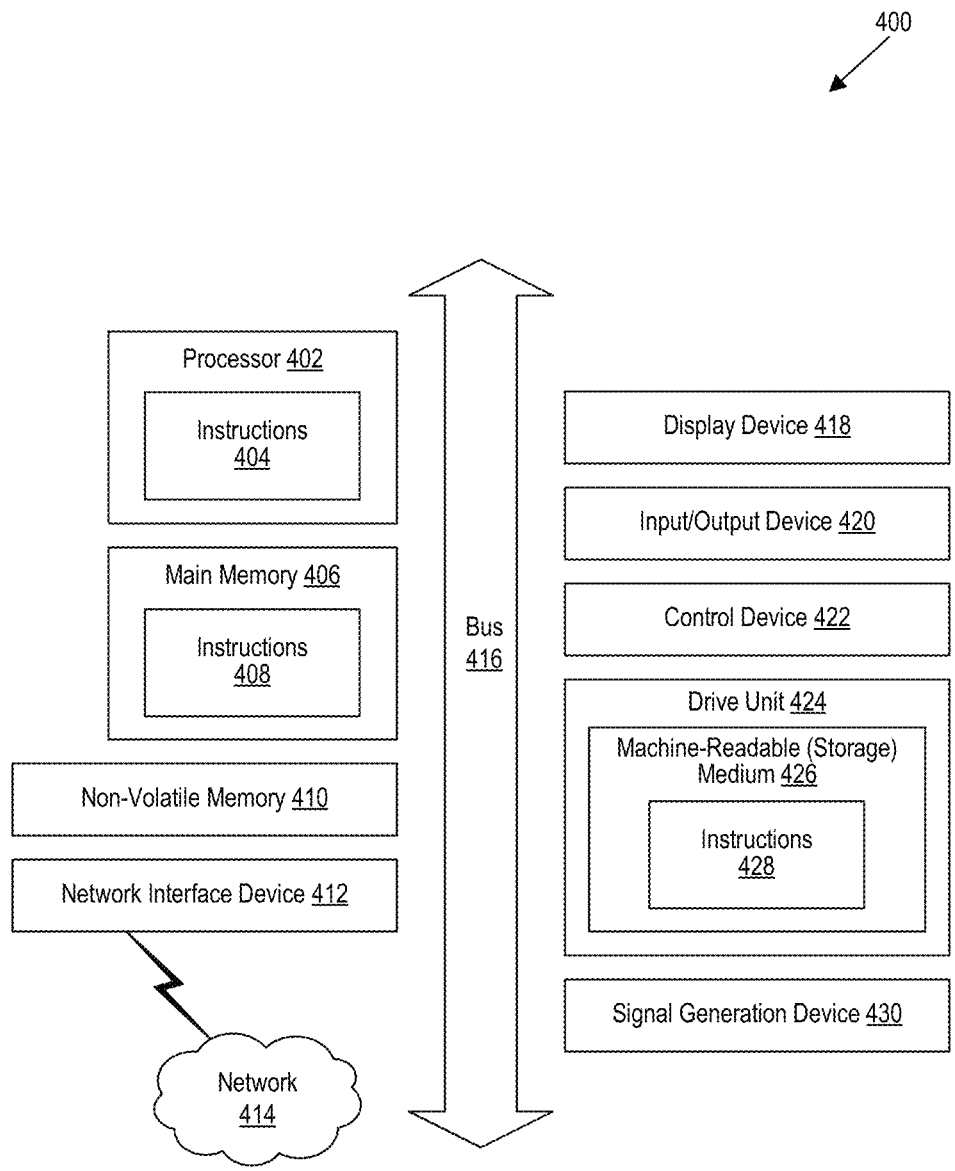
FIG. 4 is a block diagram that illustrates an example of a computer system in which at least some operations described herein can be implemented.

FIG. 4 is a block diagram that illustrates an example of a computer system 400 in which at least some operations described herein can be implemented. As shown, the computer system 400 can include: one or more processors 402, main memory 406, non-volatile memory 410, a network interface device 412, video display device 418, an input/output device 420, a control device 422 (e.g., keyboard and pointing device), a drive unit 424 that includes a storage medium 426, and a signal generation device 430 that are communicatively connected to a bus 416. The bus 416 represents one or more physical buses and/or point-to-point connections that are connected by appropriate bridges, adapters, or controllers. Various common components (e.g., cache memory) are omitted from FIG. 4 for brevity. Instead, the computer system 400 is intended to illustrate a hardware device on which components illustrated or described relative to the examples of the figures and any other components described in this specification can be implemented.

The computer system 400 can take any suitable physical form. For example, the computing system 400 can share a similar architecture as that of a server computer, personal computer (PC), tablet computer, mobile telephone, game console, music player, wearable electronic device, network-connected ("smart") device (e.g., a television or home assistant device), ARNR systems (e.g., head-mounted display), or any electronic device capable of executing a set of instructions that specify action(s) to be taken by the computing system 400. In some implementation, the computer system 400 can be an embedded computer system, a system-on-chip (SOC), a single-board computer system (SBC) or a distributed system such as a mesh of computer systems or include one or more cloud components in one or more networks. Where appropriate, one or more computer systems 400 can perform operations in real-time, near real-time, or in batch mode.

The network interface device 412 enables the computing system 400 to mediate data in a network 414 with an entity that is external to the computing system 400 through any communication protocol supported by the computing system 400 and the external entity. Examples of the network interface device 412 include a network adaptor card, a wireless network interface card, a router, an access point, a wireless router, a switch, a multilayer switch, a protocol converter, a gateway, a bridge, bridge router, a hub, a digital media receiver, and/or a repeater, as well as all wireless elements noted herein.

The memory (e.g., main memory 406, non-volatile memory 410, machine-readable medium 426) can be local, remote, or distributed. Although shown as a single medium, the machine-readable medium 426 can include multiple media (e.g., a centralized/distributed database and/or associated caches and servers) that store one or more sets of instructions 428. The machine-readable (storage) medium 426 can include any medium that is capable of storing, encoding, or carrying a set of instructions for execution by the computing system 400. The machine-readable medium 426 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

Although implementations have been described in the context of fully functioning computing devices, the various examples are capable of being distributed as a program product in a variety of forms. Examples of machine-readable storage media, machine-readable media, or computer-readable media include recordable-type media such as volatile and non-volatile memory devices 410, removable flash memory, hard disk drives, optical disks, and transmission-type media such as digital and analog communication links.

In general, the routines executed to implement examples herein can be implemented as part of an operating system or a specific application, component, program, object, module, or sequence of instructions (collectively referred to as "computer programs"). The computer programs typically comprise one or more instructions (e.g., instructions 404, 408, 428) set at various times in various memory and storage devices in computing device(s). When read and executed by the processor 402, the instruction(s) cause the computing system 400 to perform operations to execute elements involving the various aspects of the disclosure.

Remarks

The terms "example", "embodiment" and "implementation" are used interchangeably. For example, reference to "one example" or "an example" in the disclosure can be, but not necessarily are, references to the same implementation; and, such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described which can be exhibited by some examples and not by others. Similarly, various requirements are described which can be requirements for some examples but no other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will use the words "means for." However, the use of the term "for" in any other context is not intended to invoke a similar interpretation. The applicant reserves the right to pursue such additional claim forms in either this application or in a continuing application.

The invention claimed is:

1. A computer-readable storage medium, excluding transitory signals and carrying instructions, which, when executed by at least one data processor of a telecommunications network, cause the telecommunications network to:
   establish a first telecommunications network link between a base station of the telecommunications network and a first vehicle;
   receive, from the first vehicle, over the first telecommunications network link, a request to allocate resources to support an application, wherein the application is to be performed by the first vehicle relative to a second vehicle, and wherein the application requires establishing a direct communication link between the first vehicle and the second vehicle;
   in response to the request, allocate, based on the application, one or more resources that are configured for the direct communication link, wherein a radio spectrum band is provisioned to be shared between a second telecommunications network link and the direct communication link, and wherein the telecommunications network defines:
      blanked resources of the radio spectrum band that are disallowed for use to perform the application, and non-blanked resources of the radio spectrum band that are allowed for use to perform the application;

communicate, to the first vehicle, the allocation of the resources including the blanked resources or the non-blanked resources of the radio spectrum band, wherein the communication causes the first vehicle to establish the direct communication link with the second vehicle and use the non-blanked resources of the radio spectrum band to perform the application;

cause the first vehicle to broadcast, using a resource map locally maintained at the first vehicle, an indication of the blanked resources to a plurality of other vehicles each configured for autonomous resource allocation, such that the plurality of other vehicles perform the autonomous resource allocation according to the blanked resources defined by the telecommunications network for the first vehicle; and change the allocation of the resources based on a policy determined by a RAN intelligent controller (RIC) in a radio access network (RAN) that includes the base station, wherein the policy includes a different blanking percentage for a middle spectrum and edge spectrums of the radio spectrum band.

2. The computer-readable storage medium of claim 1, wherein prior to communicating the allocation of the resources, the telecommunications network is further caused to:

receive, over the first telecommunications network link, an indication of a requirement for the direct communication link,
wherein the requirement is selected at the first vehicle and includes a communication speed, a communication range, or a power level; and configure the allocation of the resources to satisfy the requirement and in accordance with the application.

3. The computer-readable storage medium of claim 1, wherein prior to the allocation of the resources being communicated, the telecommunications network is further caused to:

determine a requirement to perform the application using the direct communication link,
wherein the requirement is selected at the telecommunications network and includes one or more of:
a communication speed,
a communication range, or
a power level; and configure the allocation of the resources to satisfy the requirement and in accordance with the application.

4. The computer-readable storage medium of claim 1, wherein to allocate the resources comprises causing the telecommunications network to:

select a first subset of resource blocks (RBs) as the blanked resources of the radio spectrum band; and
select a second subset of RBs as the non-blanked resources of the radio spectrum band,
wherein the first subset of RBs and the second subset of RBs are selected from a pool of RBs available for the first vehicle.

5. The computer-readable storage medium of claim 1, wherein the telecommunications network is further caused to:

establish the second telecommunications network link between the telecommunications network and a wireless device, and
wherein the blanked resources of the radio spectrum band are allowed for communicating between the telecommunications network and the wireless device.

6. The computer-readable storage medium of claim 1, wherein the telecommunications network is further caused to:

establish the second telecommunications network link between the telecommunications network and a wireless device,
wherein the wireless device includes any of:
an Internet-of-Things (IoT) device,
a drone device,
a mobile terminal, or
a smart device.

7. The computer-readable storage medium of claim 1, wherein the second telecommunications network link corresponds to the first telecommunications network link, the telecommunications network being further caused to:

communicate with the first vehicle over the first telecommunications network by using the blanked resources.

8. The computer-readable storage medium of claim 1, wherein the application comprises:

platooning of multiple vehicles including the first vehicle,
cooperative operation including sensor sharing among multiple vehicles including the first vehicle,
remote driving of the first vehicle,
autonomous driving of the first vehicle,
driver assistance of the first vehicle,
traffic management of multiple vehicles including the first vehicle,
safety management of the first vehicle, or
navigation of the first vehicle.

9. The computer-readable storage medium of claim 1, wherein the telecommunications network is caused to:

dynamically update the blanked resources of the radio spectrum band to mitigate potential or actual interference between the second telecommunications network link and the direct communication link.

10. The computer-readable storage medium of claim 1, wherein the telecommunications network is further caused to:

change the allocation of the resources based on data at a core network,
wherein the data includes a quality of service (QoS) profile of the direct communication link.

11. The computer-readable storage medium of claim 1, wherein the telecommunications network is further caused to:

change the allocation of the resources based on the resource map locally maintained at the first vehicle,
wherein the resource map defines a pattern of blanked Resource Blocks (RBs), and
wherein the blanked RBs are disallowed for use to perform the application.

12. The computer-readable storage medium of claim 1, wherein to allocate the resources comprises causing the telecommunications network to:

select, at a core network, a pattern of blanked Resource Blocks (RBs); and
change, at the base station, the pattern of blanked RBs based on a current utilization of the base station by multiple vehicles or wireless devices.

13. The computer-readable storage medium of claim 1:
wherein the application is one of multiple types of applications, and wherein allocation of the resources depends on a type of application of the multiple types of applications.

14. A method performed by a wireless network to mitigate interference between communication links including a direct communication link established between two wireless devices, the method comprising:
receiving a request to allocate a resource for the direct communication link between a first wireless device and a second wireless device,
wherein the request includes an indication of an operation to be performed by the first wireless device relative to the second wireless device, and
wherein the resource is configured to share between the direct communication link and another communication link;
in response to the request, designating a blanked portion of the resource for the direct communication link,
wherein the blanked portion is disallowed for use to communicate between the first wireless device and the second wireless device, and
wherein at least some of a remaining portion of the resource is allowed for use to communicate between the first wireless device and the second wireless device;
causing the first wireless device to establish the direct communication link with the second wireless device,
wherein the direct communication link includes the blanked portion of the resource;
causing the first wireless device to broadcast, using a resource map locally maintained at the first wireless device, an indication of the blanked portion of the resource designated by the wireless network to a plurality of other wireless devices each configured for autonomous resource allocation, such that the plurality of other wireless devices perform the autonomous resource allocation according to the blanked portion of the resource defined by the wireless network; and
changing the allocation of the resources based on a policy determined by a RAN intelligent controller (RIC) in a radio access network (RAN) of the wireless network, wherein the policy includes a different blanking percentage for a middle spectrum and edge spectrums of a radio spectrum band.

15. The method of claim 14 further comprising, prior to causing the first wireless device to establish the direct communication link with the second wireless device:
selecting, based on a type of application associated with the operation, requirements from among multiple requirements for the direct communication link,
wherein the type of application is one of multiple types of applications; and
configuring the resource in accordance with the selected requirement.

16. The method of claim 14, wherein the first wireless device and the second wireless device are different types of devices, and wherein each is one of the following types of devices:
an Internet-of-Things (IoT) device,
a drone device,
a vehicle device,
a mobile terminal, or
a smart device.

17. A vehicle device comprising:
at least one hardware processor; and
at least one non-transitory memory storing instructions, which, when executed by the at least one hardware processor, cause the vehicle device to:
determine a type of application to be performed by the vehicle device relative to a wireless device,
wherein performing the type of application requires establishing a direct communication link between the vehicle device and the wireless device;
establish a mobile network communication link between the vehicle device and a base station of a mobile network;
send, to the base station, over the mobile network communication link, an indication of the type of application;
receive, from the base station, an indication of an allocation of a radio spectrum band for the direct communication link,
wherein the allocation includes a blanked portion that is disallowed from carrying data associated with performing the type of application;
establish the direct communication link including the blanked portion that is disallowed from carrying data associated with performing the type of application,
wherein a remaining portion of the radio spectrum band is allowed to carry data associated with performing the type of application;
broadcast, using a preconfigured map managed by the vehicle device, an indication of the allocation of the radio spectrum band to a plurality of other wireless devices each configured for autonomous resource allocation, such that the plurality of other wireless devices perform the autonomous resource allocation according to the allocation of the radio spectrum band defined by the base station; and
receive a changed allocation of the radio spectrum band that includes a different blanking percentage for a middle spectrum and edge spectrums of the radio spectrum band based on a policy determined by a RAN intelligent controller (RIC) in a radio access network (RAN) of the mobile network.

18. The vehicle device of claim 17 further caused to:
change the allocation of the radio spectrum band for the direct communication link based on the preconfigured map managed by the vehicle device,
wherein the preconfigured map associates patterns of blanked portions of resources to multiple types of applications.

19. The vehicle device of claim 17, wherein the blanked portion of the radio spectrum band comprises a pattern of multiple windows that are disallowed from carrying data associated with performing the type of application.

* * * * *